(12) United States Patent
Takeda et al.

(10) Patent No.: US 10,993,194 B2
(45) Date of Patent: Apr. 27, 2021

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Liu Liu, Beijing (CN); Lihui Wang, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/202,552

(22) Filed: Nov. 28, 2018

(65) Prior Publication Data

US 2019/0116562 A1    Apr. 18, 2019

Related U.S. Application Data

(63) Continuation of application No. 15/309,231, filed as application No. PCT/JP2015/063243 on May 8, 2015, now abandoned.

(30) Foreign Application Priority Data

May 8, 2014    (JP) ................. 2014-096660

(51) Int. Cl.
*H04W 52/36*    (2009.01)
*H04W 72/04*    (2009.01)
(Continued)

(52) U.S. Cl.
CPC ........... *H04W 52/365* (2013.01); *H04W 8/24* (2013.01); *H04W 52/34* (2013.01); *H04W 72/04* (2013.01); *H04W 52/146* (2013.01)

(58) Field of Classification Search
CPC ..... H04W 8/24; H04W 52/146; H04W 52/34; H04W 52/365; H04W 72/04; H04W 88/06

See application file for complete search history.

(56) References Cited

U.S. PATENT DOCUMENTS

| 6,088,337 A | 7/2000 | Eastmond et al. |
| 9,480,023 B2 | 10/2016 | Gao et al. |

(Continued)

FOREIGN PATENT DOCUMENTS

| CN | 102573030 A | 7/2012 |
| JP | 20125078 A | 1/2012 |

OTHER PUBLICATIONS

International Search Report issued in PCT/JP2015/063243, dated Aug. 4, 2015 (2 pages).

(Continued)

*Primary Examiner* — Asad M Nawaz
*Assistant Examiner* — Thomas R Cairns
(74) *Attorney, Agent, or Firm* — Osha Bergman Watanabe & Burton LLP

(57) ABSTRACT

The present invention relates to reducing the decrease of uplink throughput in the event a user terminal connects with a plurality of radio base stations. In one aspect of the claimed invention, a user terminal includes a transmitter that performs transmission in a first cell group (CG) and a second CG, and a processor that, if the transmitter reports user terminal capability information indicating that the user terminal is capable of sharing transmission power dynamically and if transmission in the first CG overlaps in time with transmission in the second CG, scales transmission power of the second CG so that total transmission power of the transmission in the first CG and the transmission in the second CG does not exceed maximum allowable power.

6 Claims, 14 Drawing Sheets

(51) Int. Cl.
*H04W 52/34* (2009.01)
*H04W 8/24* (2009.01)
*H04W 52/14* (2009.01)

(56) References Cited

U.S. PATENT DOCUMENTS

| | | | |
|---|---|---|---|
| 9,585,101 | B2 | 2/2017 | Stern-Berkowitz et al. |
| 9,749,963 | B2 | 8/2017 | Hwang et al. |
| 9,763,199 | B2* | 9/2017 | Pelletier .............. H04W 52/343 |
| 2013/0034087 | A1 | 2/2013 | Kwon et al. |
| 2013/0100842 | A1 | 4/2013 | Nishikawa et al. |
| 2013/0176953 | A1 | 7/2013 | Stern-Berkowitz et al. |
| 2013/0196707 | A1* | 8/2013 | Baldemair ............ H04B 7/0626 455/522 |
| 2014/0192738 | A1 | 7/2014 | Nam et al. |
| 2014/0329555 | A1 | 11/2014 | Gao et al. |
| 2015/0215944 | A1 | 7/2015 | Kim et al. |
| 2020/0220672 | A1* | 7/2020 | Kim ........................ H04L 5/001 |

OTHER PUBLICATIONS

Written Opinion of the International Searching Authority issued in PCT/JP2015/063243, dated Aug. 4, 2015 (4 pages).
Huawei, HiSilicon; "Uplink Power allocation in Dual connectivity"; 3GPP TSG RAN WG1 Meeting #76bis, R1-141134; Shenzhen, China; Mar. 31-Apr. 4, 2014 (6 pages).
Texas Instruments; "UL Power Control Considerations for Dual Connectivity"; 3GPP TSG RAN WG1 #76bis, R1-141604; Shenzhen, China; Mar. 31-Apr. 4, 2014 (5 pages).
Ericsson; "RAN4 impacts of dual connectivity"; 3GPP TSG-RAN WG4 Meeting #70bis, R4-142082; San Jose Del cabo, Mexico; Mar. 31-Apr. 4, 2014 (5 pages).
NTT DOCOMO; "Transmit power control for dual connectivity"; 3GPP TSG RAN WG1 Meeting #76bis, R1-141469; Shenzhen, China; Mar. 31-Apr. 4, 2014 (10 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action issued in the counterpart Japanese Patent Application No. 2014096660, dated Mar. 22, 2016 (4 pages).
Office Action issued in the counterpart Japanese Patent Application No. 2016-121519, dated Jul. 4, 2017 (16 pages).
Extended European Search Report issued in the counterpart European Patent Application No. 15789819.8, dated Oct. 11, 2017 (13 pages).
Samsung; "UCI Transmission in Dual Connectivity"; 3GPP TSG RAN WG1 #76bis, R1-141294; Shenzhen, China, Mar. 31-Apr. 4, 2014 (4 pages).
MediaTek Inc.; "On physical-layer support for dual connectivity"; 3GPP TSG-RAN WG1 #76bis, R1-141487; Shenzhen, China, Mar. 31-Apr. 4, 2014 (5 pages).
Fujitsu; "Power allocation strategy for power limited UEs in dual-connectivity"; 3GPP TSG RAN WG1 Meeting #76bis, R1-141227; Shenzhen, China, Mar. 31-Apr. 4, 2014 (6 pages).
Panasonic; "Power control on dual connectivity"; 3GPP TSG RAN WG1 Meeting #76bis, R1-141216; Shenzhen, China, Mar. 31-Apr. 4, 2014 (3 pages).
Extended European Search Report issued in the counterpart European Patent Application No. 18184703.9, dated Oct. 2, 2018 (12 pages).
Office Action issued in Chinese Application No. 201580023867.1, dated Mar. 4, 2019 (17 pages).
Office Action issued in Chinese Application No. 201810743186.8, dated Sep. 23, 2020 (13 pages).

* cited by examiner

USER TERMINAL, RADIO BASE STATION AND RADIO COMMUNICATION METHOD

CROSS-REFERENCE TO RELATED APPLICATIONS

The present application is a continuation application and, thereby, claims benefit under 35 U.S.C. § 120 to U.S. patent application Ser. No. 15/309,231 filed on Nov. 7, 2016, titled, "USER TERMINAL, RADIO BASE STATION AND RADIO COMMUNICATION METHOD," which is a national stage application of PCT Application No. PCT/JP2015/063243, filed on May 8, 2015, which claims priority to Japanese Patent Application No. 2014-096660 filed on May 8, 2014. The contents of the priority applications are incorporated by reference in their entirety.

TECHNICAL FIELD

The present invention relates to a user terminal, a radio base station, a radio communication method and a radio communication system in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delay and so on (see non-patent literature 1).

In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE—referred to as, for example, "LTE-advanced" or "LTE enhancement"—have been under study for the purpose of achieving further broadbandization and increased speed beyond LTE, and the specifications thereof have been drafted as LTE Rel. 10/11 (LTE-A). The system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When a plurality of cells are formed by the same radio base station in effect, the above-described CA is applicable. On the other hand, when a plurality of cells are formed by completely different radio base stations, dual connectivity (DC) may be applied.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

As noted earlier, when a plurality of cell groups are formed by the same radio base station in effect (for example, when CA is employed), the radio base station can control uplink transmission power by taking into account the uplink transmission power of user terminals in each cell in a comprehensive manner. However, as in dual connectivity, when a plurality of radio base stations independently control the uplink transmission power of user terminals, this may result in a decrease of uplink throughput, a deterioration of communication quality, and so on.

The present invention has been made in view of the above, and it is therefore an object of the present invention to provide a user terminal, a radio base station, a radio communication method and a radio communication system that can reduce the decrease of uplink throughput when a user terminal connects with a plurality of radio base stations.

Solution to Problem

The user terminal according to an example of the present invention provides a user terminal that communicates by using a first cell group (CG) and a second CG, and this user terminal has a transmission section that transmits uplink signals of a plurality of types in each CG, and a control section that allocates power to an uplink signal of a given type to transmit in the first CG more preferentially than the uplink signal of the given type to transmit in the second CG.

Advantageous Effects of Invention

According to the present invention, the decrease of uplink throughput when a user terminal connects with a plurality of radio base stations can be reduced.

DESCRIPTION OF EMBODIMENTS

Now, embodiments of the present invention will be described below in detail with reference to the accompanying drawings.

Carrier aggregation and dual connectivity are both techniques to allow a user terminal to connect and communicate with a plurality of cells at the same time, and are applied to, for example, a HetNet (Heterogeneous Network). Here, the "HetNet," which is under study in LTE-A systems, refers to a structure in which small cells, each having a local coverage area of a radius of approximately several tens of meters, are formed within a macro cell having a wide coverage area of a radius of approximately several kilometers. Note that carrier aggregation may be referred to as "intra-eNB CA," and dual connectivity may be referred to as "inter-eNB CA."

FIG. 1 provide schematic diagrams of carrier aggregation and dual connectivity. In the examples shown in FIG. 1, a user terminal UE communicates with radio base stations eNB1 and eNB2.

FIG. 1 show control signals that are transmitted and received via a physical downlink control channel (PDCCH) and a physical uplink control channel (PUCCH). For example, downlink control information (DCI) is transmitted using the PDCCH, and uplink control information (UCI) is transmitted via the PUCCH. Note that an enhanced physical downlink control channel (EPDCCH: Enhanced PDCCH) may be used instead of the PDCCH.

Figure 1A:
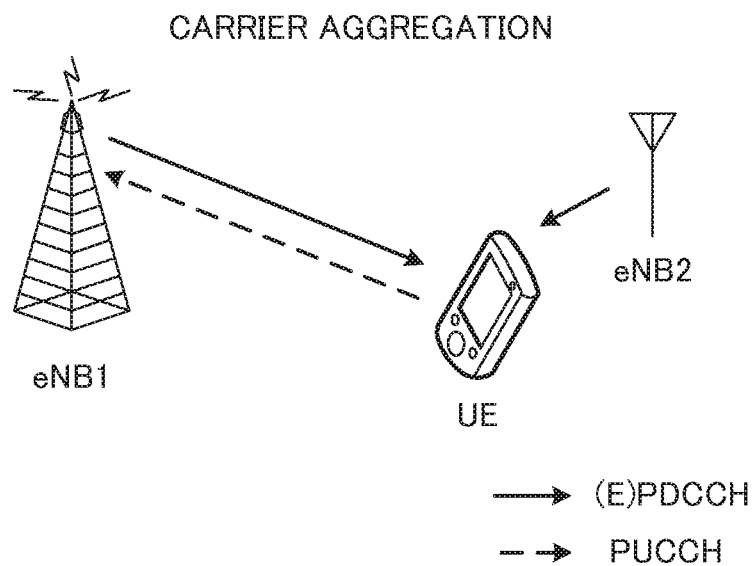
FIG. 1A provides a schematic diagram of carrier aggregation.

FIG. 1A shows communication among radio base stations eNB1 and eNB2 and the user terminal UE by way of carrier aggregation. In the exampled shown in FIG. 1A, eNB1 is a radio base station to form a macro cell (hereinafter referred to as the "macro base station"), and eNB2 is a radio base station to form a small cell (hereinafter referred to as the "small base station").

For example, the small base station may be structured like an RRH (Remote Radio Head) that connects with the macro base station. When carrier aggregation is employed, one scheduler (for example, the scheduler provided in macro base station eNB1) controls the scheduling of multiple cells.

In a structure in which a scheduler provided in a macro base station controls the scheduling of multiple cells, each base station may be connected using, for example, an ideal backhaul that provides a high speed channel such as optical fiber.

Figure 1B:
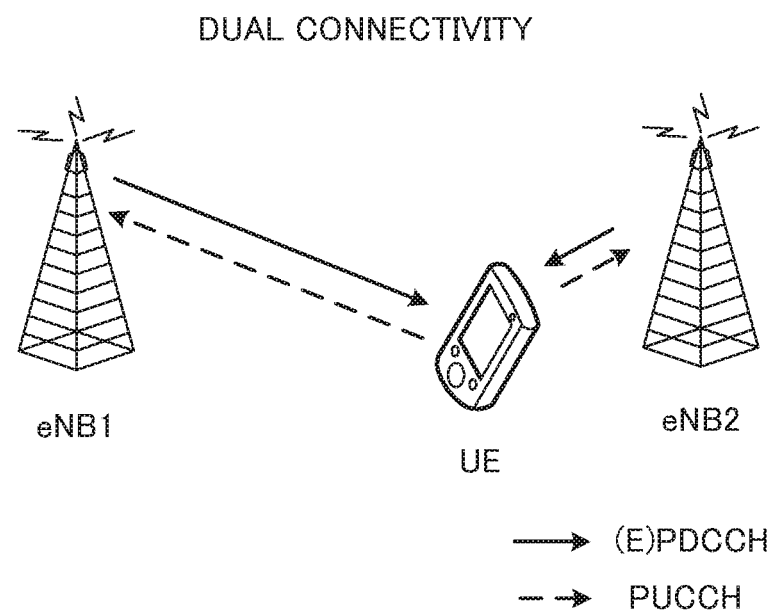
FIG. 1B provides a schematic diagram of dual connectivity.

FIG. 1B shows communication among radio base stations eNB1 and eNB2 and a user terminal UE by way of dual connectivity. In the example shown in FIG. 1B, eNB1 and eNB2 are both macro base stations.

When dual connectivity is employed, a plurality of schedulers are provided independently, and these multiple schedulers (for example, the scheduler provided in macro base station eNB1 and the scheduler provided in macro base station eNB2) each control the scheduling of one or more cells they have control over.

In the structure in which the scheduler provided in macro base station eNB1 and the scheduler provided in macro base station eNB2 each control the scheduling of one or more cells they have control over, each base station may be connected using, for example, a non-ideal backhaul to produce delays that cannot be ignored, such as the X2 interface.

Consequently, it is generally assumed that, in dual connectivity, close coordinated control between eNBs equivalent to carrier aggregation cannot be executed. Consequently, downlink L1/L2 control (PDCCH/EPDCCH) and uplink L1/L2 control (UCI feedback by the PUCCH/PUSCH) needs to be carried out independently in each eNB.

FIG. 2 provide diagrams to show example cell structures in carrier aggregation and dual connectivity. In FIG. 2, the UE is connected with five cells (C1 to C5). C1 is a PCell (Primary Cell), and C2 to C5 are SCells (Secondary Cells).

Figure 2A:
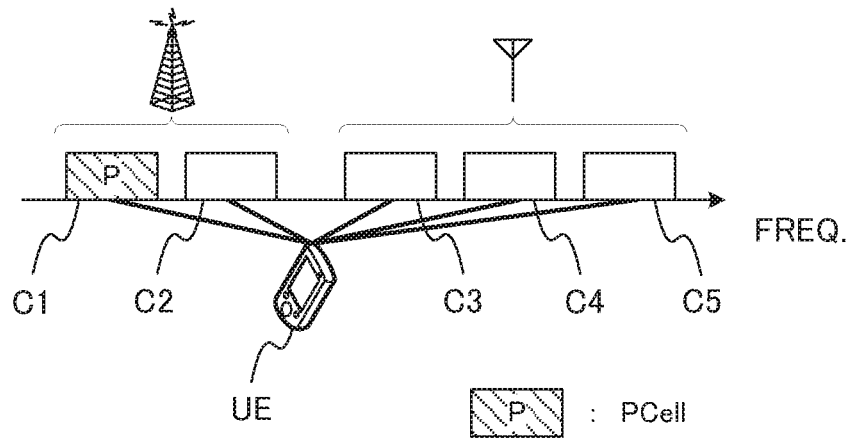
FIG. 2A provides a diagram to show an example cell structure in carrier aggregation.

As shown in FIG. 2A, in carrier aggregation, uplink control signals are transmitted via the PCell, so that the SCells do not have to have the functions of the PCell.

Figure 2B:
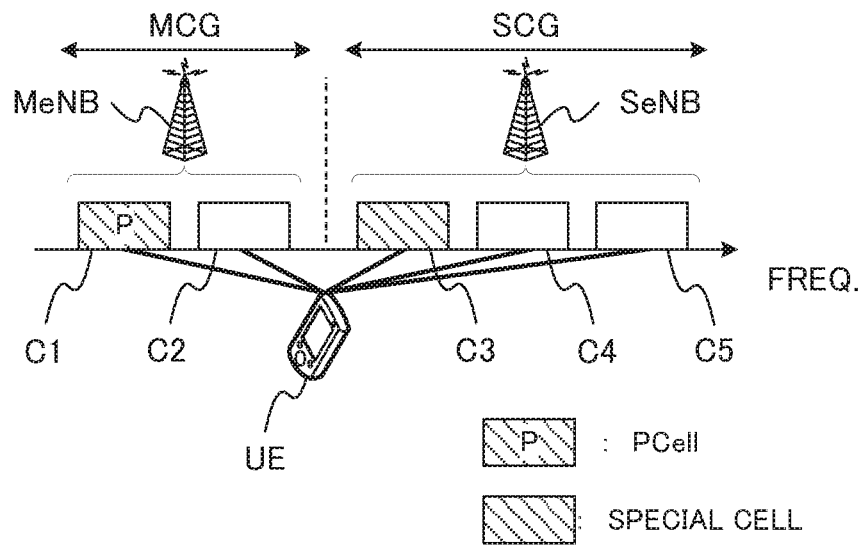
FIG. 2B provides a diagram to show an example cell structure in dual connectivity.

On the other hand, as shown in FIG. 2B, in dual connectivity, each radio base station is configured in a cell group (CG), which is formed with one cell or a plurality of cells. Each cell group is comprised of one or more cells formed by the same radio base station, or one or more cells formed by the same transmission point such as a transmitting antenna apparatus, a transmission station, and so on.

Here, the cell group to include the PCell is referred to as the "master cell group (MCG)," and the cell groups other than the MCG will be referred to as "secondary cell groups (SCGs)." In each cell group, two or more cells can execute carrier aggregation.

Also, the radio base station where the MCG is configured is referred to as the "master base station (MeNB: Master eNB)," and the radio base stations where the SCGs are configured are referred to as "secondary base stations (SeNBs: Secondary eNBs)."

The total number of cells to constitute the MCG and the SCGs is configured to be equal to or less than a predetermined value (for example, five (cells)). This predetermined value may be set in advance, or may be configured semi-statically or dynamically between the radio base stations eNB and the user terminal UE. Also, depending on the implementation of the user terminal UE, the value of the sum of the cells to constitute the MCG and the SCGs and the combination of cells that can be configured may be reported to the radio base stations eNB in the form of user terminal capability information (UE capability information).

In dual connectivity, as noted earlier, significant backhaul delays may be produced between eNBs. Consequently, each eNB transmits and receives control information to and from UEs independently, so that, even in SeNBs, a cell (also referred to as a "special cell," a "PUCCH configured cell" and so on) that is special and has functions (common search space, the PUCCH, etc.) equivalent to those of the PCell is required. In the example FIG. 2B, cell C3 is configured as a cell of that kind.

Figure 3:
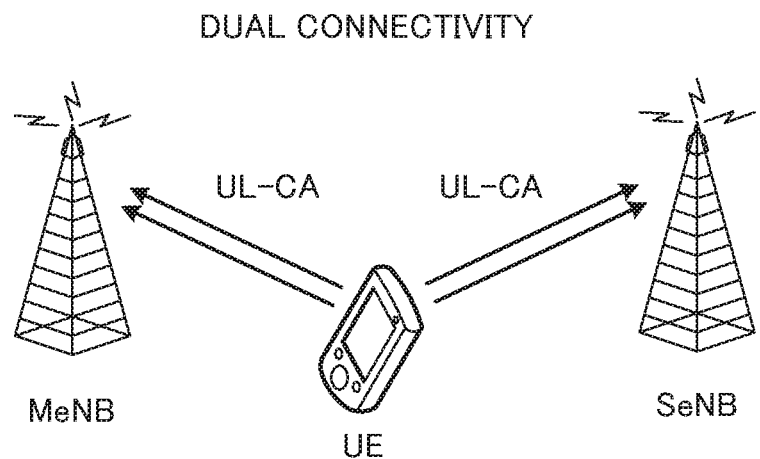
FIG. 3 is a diagram to show an example case of connecting with each radio base station by way of UL-CA in dual connectivity.

As described above, in dual connectivity, a user terminal has to connect with each of a plurality of radio base stations in at least one uplink serving cell. Furthermore, a study is in progress to carry out UL-CA (uplink carrier aggregation) to involve two or more uplink serving cells for each radio base station. FIG. 3 is a diagram to show an example case of connecting with each radio base station by way of UL-CA in dual connectivity. In FIG. 3, the user terminal connects with the MeNB and the SeNB via UL-CA.

Here, uplink signal transmission timings are controlled separately between the MeNB and the SeNB. Furthermore, uplink signal transmission power control is also carried out separately between the MeNB and the SeNB. Consequently, cases might occur in which, in timings where uplink signal transmissions for the MeNB and the SeNB overlap, there is a demand to transmit uplink signals beyond the maximum allowable power (Pcmax) of the user terminal. In the following description, "power-limited" will refer to the state in which transmission power is limited because uplink signal transmissions to exceed the maximum allowable power of a user terminal are in demand.

When this takes place, the user terminal has to lower the transmission power down to or below the maximum allowable power by reducing the transmission power, by dropping transmitting signals, and so on, based on some rules. Here, UL-CA of LTE Rel. 11 provides for configuring priorities for uplink signals of a plurality of types to transmit to one radio base station, and allowing a user terminal to adjust transmission power based on these priorities so that the total of each CC's transmission power does not exceed the maximum allowable power.

Figure 4:
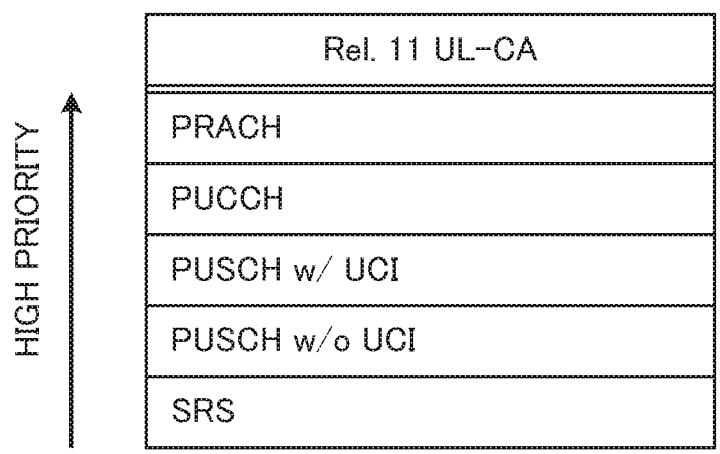
FIG. 4 is a diagram to show the priorities of uplink signals in UL-CA of LTE Rel. 11.

FIG. 4 is a diagram to show the priorities of uplink signals in UL-CA of LTE Rel. 11. As shown in FIG. 4, in Rel. 11, the PRACH has the highest priority, followed by the lower priorities of the PUCCH, PUSCH w/UCI (PUSCH including UCI), the PUSCH w/o UCI (PUSCH not including UCI), and the SRS, in order. Note that each channel in FIG. 4 represents the signal to be transmitted via that channel, and will be represented likewise in the following description.

In UL-CA of LTE Rel. 11, when the transmission periods of signals of varying priorities overlap and the power-limited state is produced, the signals of the lower priorities may be subjected to power scaling, or may be controlled not to be transmitted (that is, dropped). Furthermore, when signals of the same priority overlap and the power limited state is produced, control may be executed so that power scaling is applied to both signals in the same ratio.

However, LTE Rel. 12 provides no stipulation regarding the priorities between CGs/eNBs in dual connectivity. Consequently, when a user terminal manipulates the transmission power of uplink signals for each CG/eNB, there is a threat of causing an uplink signal quality deterioration that is not intended by the radio base stations, which then might result in increased retransmissions, a decrease of throughput, and so on.

In order to solve this problem, the present inventors have studied adequately configuring the priorities of uplink signals in transmission to the MeNB and the SeNB when dual connectivity is employed. As a result of this, the present inventors have come up with the idea of prioritizing transmitting given uplink signal for the MeNB over transmitting the same given uplink signals for the SeNB. According to this structure, a user terminal can reduce the impact of the limitation of the maximum allowable power by increasing the priority of important control signals.

Furthermore, the present inventors have also come up with the idea of executing adequate power control by taking into account the above-mentioned priorities when the transmission timings of uplink signals are not synchronized between a plurality of radio base stations.

Now, embodiment of the present invention will be described below in detail. Note that, although, for ease of explanation, examples will be described below in which a user terminal connects with two radio base stations (MeNB and SeNB) in dual connectivity, this is by no means limiting. For example, the present invention is applicable to cases where a user terminal connects and communicates with three or more radio base stations that each execute control with an independent scheduler. Furthermore, it is equally possible to employ a structure in which a user terminal connects with cell groups, instead of radio base stations, so that radio base stations or cell groups will be hereinafter also referred to as "eNBs" or "CGs."

Figure 5A:
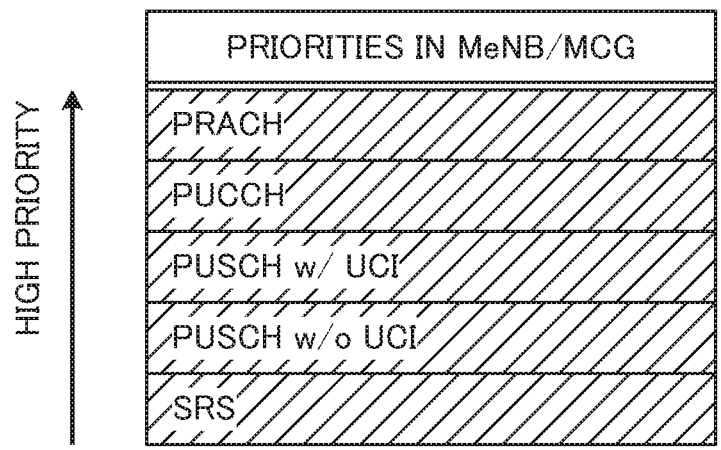
FIG. 5A provides a diagram to show an example of priorities of uplink signals in each eNB/CG.
Figure 5B:
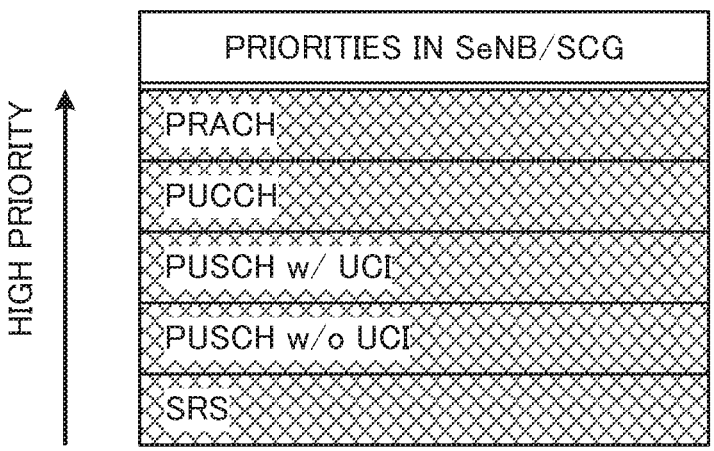
FIG. 5B provides a diagram to show another example of priorities of uplink signals in each eNB/CG.

Also, hereinafter, priorities in each eNB/CG will maintain the order of priorities (priority rule) shown in FIG. 5. FIG. 5 provide diagrams to show examples of the priorities of uplink signals in each eNB/CG. FIG. 5A shows examples of priorities in the MeNB/MCG, and FIG. 5B shows examples of priorities in the SeNB/SCG. These priorities show the same order of priorities as in UL-CA of Rel. 11 shown in FIG. 4 (the order of the PRACH, the PUCCH, the PUSCH w/ UCI, the PUSCH w/o UCI and the SRS). By employing such structures, it is possible to carry out processes in user terminals in a uniform way with Rel. 11, and reduce the cost of implementation. Note that the priorities in each eNB/CG are not limited to the order of priorities of FIG. 5, and other orders of priorities may be used as well.

First Embodiment

With a first embodiment of the present invention, every uplink signal for the MCG/MeNB is assigned a higher priority than an uplink signal of the same type for the SCG/SeNB.

Figure 6:
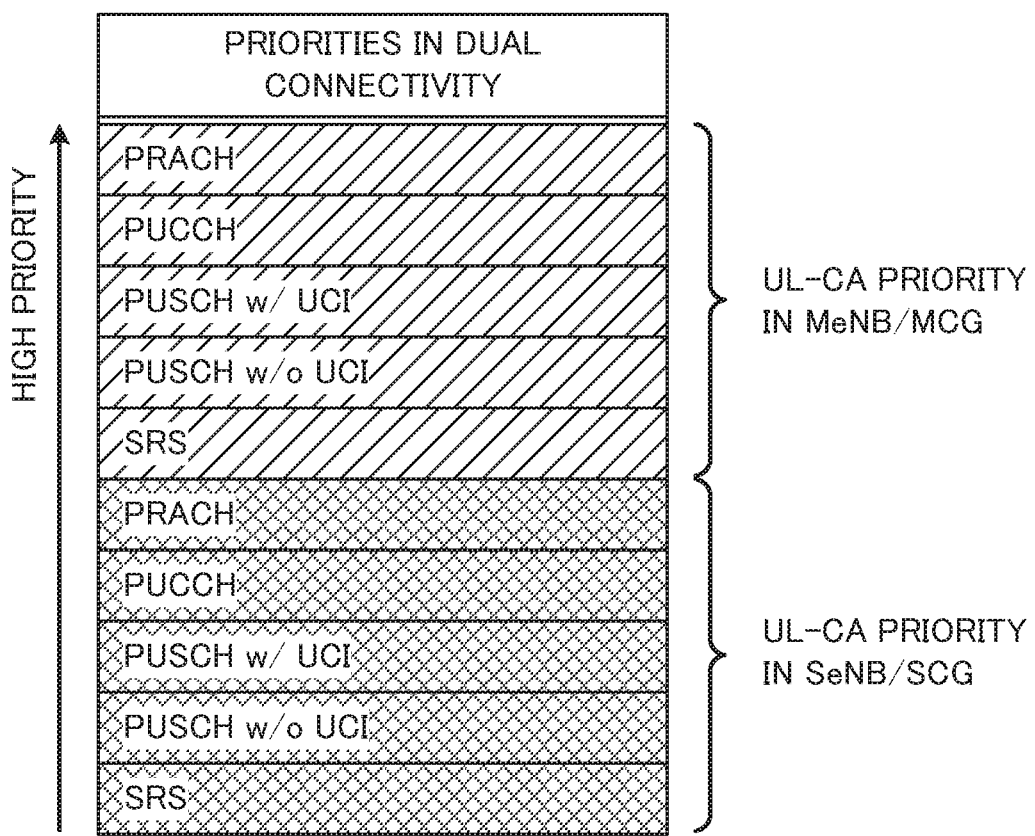
FIG. 6 is a diagram to show examples of priorities of uplink signals in dual connectivity according to a first embodiment.

According to an example of the first embodiment, the priority rule is configured so that all uplink signals for the MeNB/MCG are prioritized over all uplink signals for the SeNB/SCG. FIG. 6 is a diagram to show an example of the priorities of uplink signals in dual connectivity according to the first embodiment. As shown in FIG. 6, in this priority rule, the UL-CA priorities in the MeNB/MCG (FIG. 5A) are configured higher than the UL-CA priorities in the SeNB/SCG (FIG. 5B).

By following this priority rule, it is possible to prevent deterioration in the MCG/MeNB due to the power-limited state, and apply dual connectivity without sacrificing the macro cell coverage.

Note that, in the above example, the SRS and/or the PUSCH w/o UCI may be made an exception, and their priorities may be lowered significantly in both the MeNB/SeNB, regardless of the priority rule. For example, in FIG. 6, the priorities of the PUSCH w/o UCI and the SRS for the MeNB may be made lower than that of the PUSCH w/ UCI for the SeNB. By this means, it is possible to further reduce the negative influence that is produced when MeNB channels of lower priorities consume power and signals that relate to the connectivity and delays of the SeNB in a significant way such as the PRACH and the PUCCH for the SeNB cannot secure power.

Furthermore, in the above example, the PRACH and the PUCCH may be made an exception, and their priorities may be increased significantly in both the MeNB/SeNB, regardless of the above priority rule. For example, in FIG. 6, the priorities of the PRACH and the PUCCH for the SeNB may be made higher than that of the PUSCH w/ UCI for the MeNB. By this means, it is possible to further reduce the negative influence that is produced when MeNB channels of lower priorities consume power and signals that relate to the connectivity and delays of the SeNB in a significant way such as the PRACH and the PUCCH for the SeNB cannot secure power.

According to another example of the first embodiment, every time there are uplink signals of the same type, the MeNB/MCG has a higher priority than the SeNB/SCG, and their priorities are configured to neighbor each other. To "neighbor each other" here means, in other words, not configuring the priorities of signals of other types between the priorities of signals of the same type.

Figure 7:
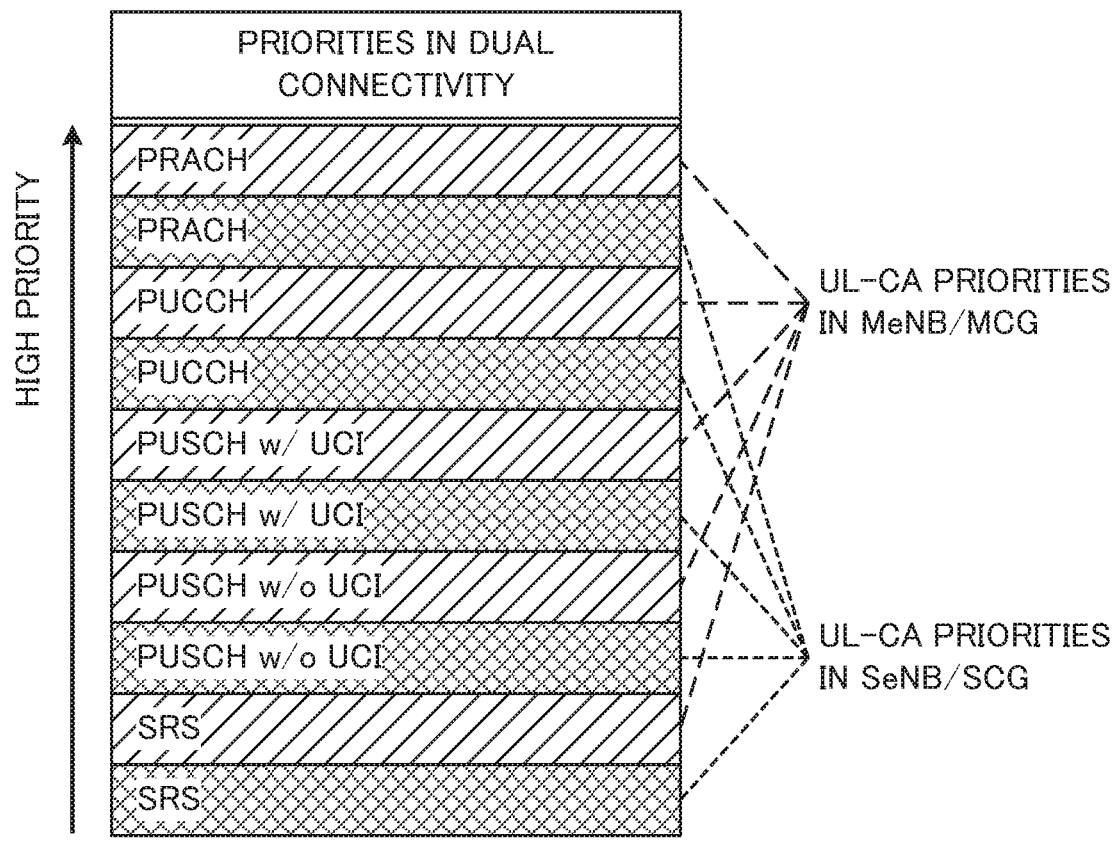
FIG. 7 is a diagram to show examples of priorities of uplink signals in dual connectivity according to a first embodiment.

FIG. 7 is a diagram to show examples of the priorities of uplink signals in dual connectivity according to the first embodiment. In FIG. 7, the priority rule is configured so that the priorities in each eNB/CG are the same as in UL-CA of Rel. 11. According to this priority rule, the priority of each signal is configured higher in the MeNB/MCG than in the SeNB/SCG. That is, according to the present embodiment, the priorities of uplink signals of the same type are taken together, and the priority rule is configured to be the same as in each eNB/CG.

By following this priority rule, it is possible to preferentially allocate power to signals of higher priorities regardless of the eNB/CG. In particular, the priority of the PUSCH, the bandwidth of which easily widens and which is therefore likely to be a cause of the power-limited state, can be made relatively low, so that it is possible to reduce the impact on important control signals such as the PRACH, the PUCCH and so on.

Note that a structure may be possible in which a given signal has the same priority between the MeNB/MCG and the SeNB/SCG. That is, a structure may be employed, in which, every time there are signals of the same type, the priority for the MeNB/MCG is configured to be equal to the priority for the SeNB/SCG. In this case, when the power-limited state is assumed, signals of the same priority may be subjected to scaling in equal power or in an equal ratio, or may be dropped at the same time.

As described above, according to the first embodiment, even in dual connectivity, transmission power for signals of high priorities can be secured, so that it is possible to reduce the decrease of uplink throughput.

Note that, when a user terminal holds a plurality of priority rules, the priority rule to apply may be determined based on information related to priority rules, which is reported in downlink control information (DCI) from radio base stations, higher layer signaling (for example, RRC signaling), broadcast signals (for example, SIBs) and so on. For example, a structure may be employed in which the priority rules of FIG. 6 and FIG. 7 are applied on a switched basis, based on the information reported.

Second Embodiment

When uplink signal transmission timings are not synchronized between a plurality of eNBs/CGs connected in dual connectivity (hereinafter also referred to as "asynchronous dual connectivity"), it may be difficult to follow the uplink signal priority rules described with the first embodiment.

Figure 8:
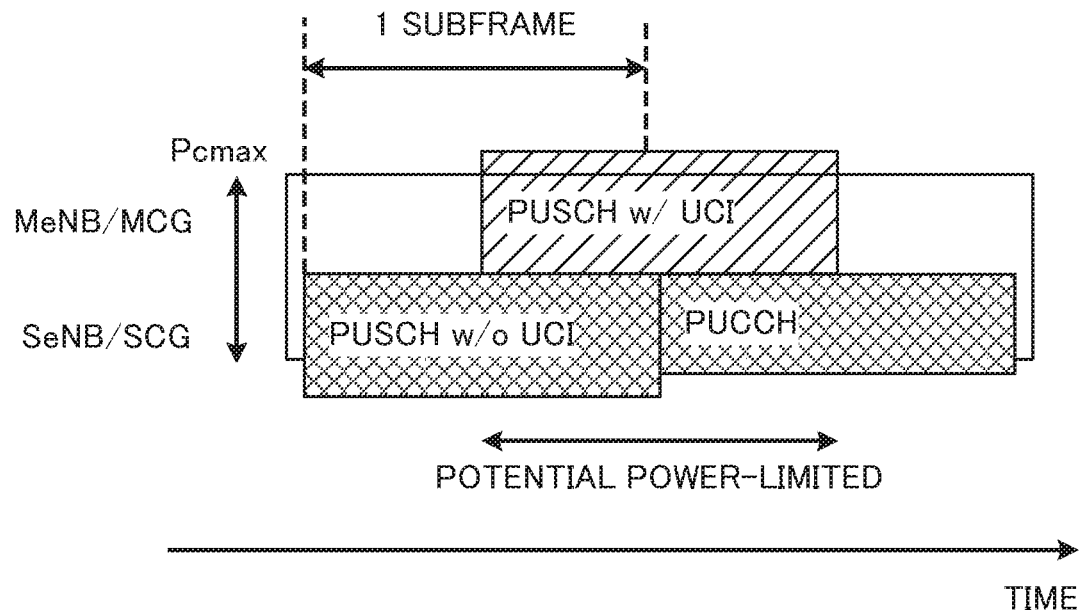
FIG. 8 is a diagram to show an example case in which a power-limited state begins in the middle of a subframe.

This problem will be described in detail with reference to FIG. 8. FIG. 8 is a diagram to show an example case where the power limited state begins in the middle of a subframe. In FIG. 8, the horizontal axis is time, and the vertical direction is the power that is allocated to transmission signals. Furthermore, the maximum allowable power of a user terminal is Pcmax, and fixed in the period illustrated.

Referring to the example of FIG. 8, first, a user terminal starts the transmission process for the PUSCH w/o UCI in the SeNB/SCG. At this time, no uplink signal is transmitted in the MeNB/MCG, so that the user terminal can transmit the signal with the transmission power demanded by the SeNB.

Next, while the PUSCH w/o UCI is transmitted in the SeNB/SCG, the PUSCH w/ UCI starts being transmitted in the MeNB/MCG. In this case, there is a risk of entering the power limited state. According to the priority rule of FIG. 6 or FIG. 7, the PUSCH w/ UCI in the MeNB/MCG has a higher priority than the PUSCH w/o UCI in the SeNB/SCG, so that it is necessary to lower the transmission power of the latter in the middle of the subframe and control the total transmission power not to exceed Pcmax.

After the transmission of the PUSCH w/o UCI is complete in the SeNB/SCG, the PUCCH starts being transmitted. In this case, there is a risk of entering the power limited state. For example, according to the priority rule of FIG. 7, the PUCCH in the SeNB/SCG has a higher priority than the PUSCH w/ UCI in the MeNB/MCG, so that it is necessary to lower the transmission power of the latter in the middle of the subframe and control the total transmission power not to exceed Pcmax.

However, it is generally settled that the operation to change the power of a signal that is being transmitted in the middle of a subframe is not preferable. If such operation is allowed, for example, problems might occur where gaps that are produced between channel estimation reference signals and data signals make demodulation based on channel estimation difficult, where the amplitude of an orthogonal code changes in the middle of the code sequence, and, when other UEs are multiplexed, the orthogonality weakens, and demultiplexing becomes difficult.

Consequently, when the priority rule shown in FIG. 6 is employed, when an MeNB/MCG transmission takes place in the middle of a subframe, it is not preferable to change the power of the signal that is being transmitted in the SeNB/SCG. Furthermore, when the priority rule shown in FIG. 7 is employed, when a transmission of a signal of a higher priority occur in the middle of a subframe, it is not preferable to change the power of the signal that is being transmitted. In this way, in asynchronous dual connectivity, it is not always possible to follow the priorities in power distribution, and cases might occur in which how to determine transmission power is not clear.

So, with a second embodiment of the present invention, in asynchronous dual connectivity, control is executed so that the transmission power of a signal is not changed in the middle of an uplink subframe (UL subframe), and the priorities described with the first embodiment are followed. To be more specific, in dual connectivity according to the present embodiment, power limited detection is carried out, and power scaling/dropping is applied when the power limited state is detected, by taking future uplink transmission signals into account, regardless of whether eNBs/CGs are synchronized or not synchronized.

First, before the transmission power of a given UL subframe is determined with respect to a given eNB/CG, the transmission power of all UL subframes of other eNBs/CGs having entirely or partly simultaneous transmission intervals with that UL subframe is investigated. In this case, the UL grants/DL assignments to command the transmission of this UL subframe and preceding or following overlapping UL subframes are detected and demodulated, and the UL transmission conditions (the bandwidth, the modulation scheme, the UL transmission power that is required based on these) are investigated.

Next, based on the result of the above investigation of UL transmission conditions, whether or not there is a part to be power-limited in the transmission timing of the UL subframes is calculated. Here, if there is a part to be power-limited, the priorities of signals in this part are compared. For example, the priorities of FIG. 6 and FIG. 7 can be used.

As a result of comparing priorities, the power allocated to the UL subframe of the lower priority (non-priority) is reduced (scaled or dropped) down to a value where the required power can be adequately distributed to the UL subframe of the higher priority (priority).

Figure 9:
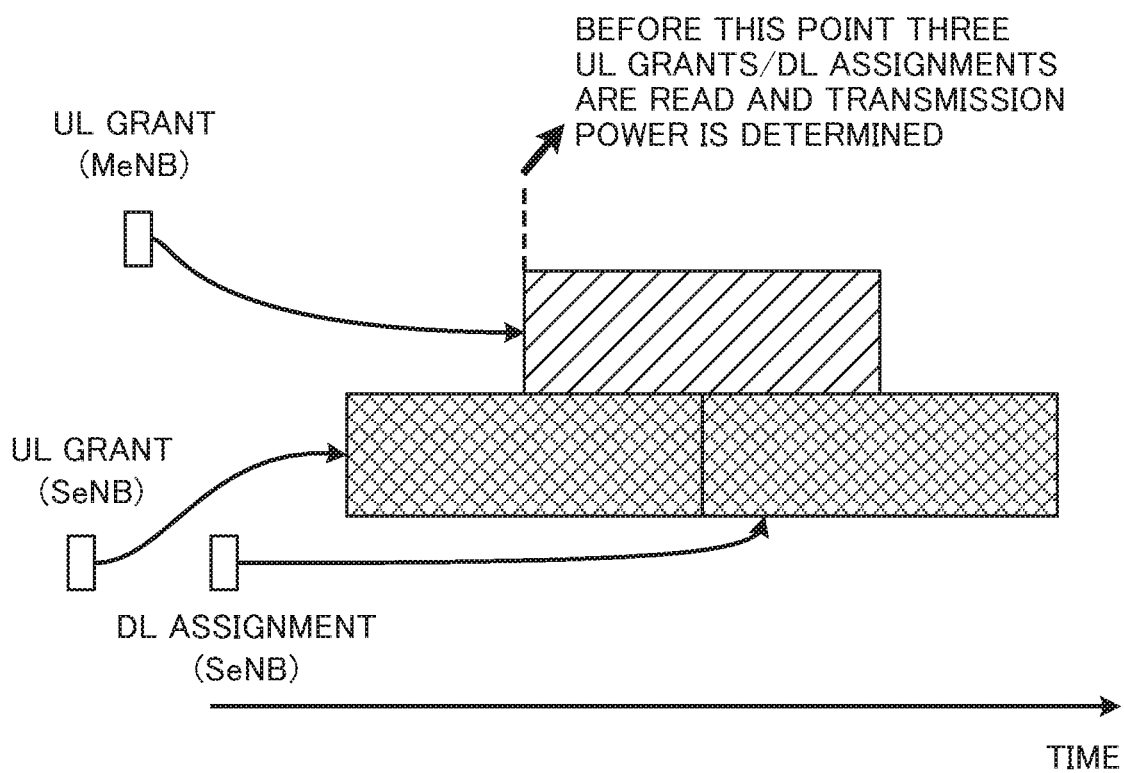
FIG. 9 is a conceptual diagram to explain transmission power control according to a second embodiment.

FIG. 9 is a conceptual diagram to explain the transmission power control of the second embodiment. In FIG. 9, one UL subframe that transmits signals in the MeNB has a partially simultaneous transmission interval with two UL subframes that transmit signals in the SeNB.

Before determining the transmission power of the MeNB UL subframe, a user terminal investigates the UL transmission power in the two SeNB UL subframes that overlap with the UL subframe, and recognizes that there is a part to be power limited, based on the information of UL grants/DL assignments that have been received. Then, the priorities of the signals in that part are compared and the transmission power of the UL subframes to transmit the signals of the lower priorities is adjusted so that sufficient power is allocated to the signal to be prioritized.

Now, an example case of applying the transmission power control of the second embodiment will be described with reference to the example of FIG. 8. Here, the priority rule shown in FIG. 7 is applied. First, before transmitting the PUSCH w/o UCI of the SeNB/SCG, a user terminal investigates the UL transmission conditions of the PUSCH w/ UCI of the MeNB/MCG in subframes that overlap with that subframe. According to FIG. 7, the PUSCH w/o UCI of the SeNB/SCG has a lower priority than the other signals, and therefore is transmitted with reduced transmission power.

Next, before transmitting the PUSCH w/ UCI of the MeNB/MCG, the user terminal investigates the UL transmission conditions of the PUSCH w/o UCI and the PUCCH of the SeNB/SCG in the overlapping subframes. According to FIG. 7, the PUSCH w/ UCI of the MeNB/MCG has a higher priority than the PUSCH w/o UCI of the SeNB/SCG, but has a lower priority than the PUCCH of the SeNB/SCG, and therefore is transmitted with reduced transmission power.

Next, before transmitting the PUCCH of the SeNB/SCG, the user terminal investigates the UL transmission conditions of the PUSCH w/ UCI of the MeNB/MCG in the overlapping subframes. According to FIG. 7, the PUCCH of the SeNB/SCG has a higher priority than the PUSCH w/ UCI of the MeNB/MCG, and therefore is transmitted with the transmission power required by the SeNB.

As described above, according to the second embodiment, transmission power control is executed by taking into account not only currently-transmitting uplink signals, but also uplink signals that are planned to be transmitted in the future, so that, even in dual connectivity, it is possible to secure transmission power for signals of high priorities, without changing transmission power in the middle of subframes, and reduce the decrease of uplink/downlink throughput.

(Variation 1)

Note that, although, with the above example of the second embodiment, the transmission power of a given UL subframe for a given eNB/CG is determined by taking into account the transmission power of all UL subframes of other eNB/CGs having entirely or partially-simultaneous transmission intervals with that UL subframe, additional UL subframes may be taken into consideration as well. To be more specific, the transmission power of UL subframes not having simultaneous transmission intervals with that UL subframe may be taken into consideration. For example, UL subframes that follow that UL subframe may be taken into account. Furthermore, it is also possible to take into account UL subframes that follow UL subframes of other eNBs/CGs having entirely or partially simultaneous transmission periods with that UL subframe. For example, referring to the example of FIG. 8, when determining the transmission power of the PUSCH w/o UCI in the SeNB/SCG, it may be possible to take the UL transmission conditions of the PUCCH of the SeNB/SCG into account, in addition to the PUSCH w/ UCI of the MeNB/MCG. By this means, it is possible to execute power control adequately by taking into account the priorities and power limited state of future signals.

(Variation 2)

Furthermore, in asynchronous dual connectivity, in order to fix the transmission power in a subframe and secure the transmission priorities of uplink signals, as shown with the second embodiment, a user terminal needs to read the UL grants/DL assignments for future transmission signals and calculate the transmission power, and, furthermore, know whether or not the power limited state will occur, and, if the power limited state will occur, how much extra power will be required. Process like this requires additional operations in the user terminal, which means that the load of terminal implementation is likely to grow heavier.

So, in systems in which dual connectivity is used, user terminal capability information (UE capability information) may be stipulated as follows. For example, user terminal capability information to represent whether or not asynchronous dual connectivity can be supported may be stipulated. Furthermore, user terminal capability information to represent whether or not the transmission power of future transmission signals can be calculated in advance may be stipulated. Also, user terminal capability information to represent whether or not transmission power can be shared between eNBs/CGs on a dynamic basis may be stipulated as well. These pieces of information are reported from user terminals to radio base stations before dual connectivity is configured. Based on these pieces of user terminal capability information, the radio base stations carry out communication so that the user terminals can execute adequate transmission power control.

Here, if a user terminal has any of these capabilities, the radio base stations may judge that the transmission power control of the second embodiment can be applied. Furthermore, if it is determined that the transmission power control according to the second embodiment cannot be applied to the user terminal, it is preferable to distribute power semi-statically in advance, on a per eNB/CG basis, so that arrangements may be made accordingly.

(Variation 3)

The above-described embodiments of the present invention may be structured to determine the distribution of power based on differences between the priorities of signals that are transmitted at the same time. For example, referring to FIG. 7, assuming that priorities are configured with increments of 1 so that the priority of the PRACH of the MeNB/MCG is 1 and the priority of the SRS of the SeNB/SCG is 10, the differences between the priorities of transmitting signals (subframes) can be calculated within a range of −9 to +9.

Figure 10:
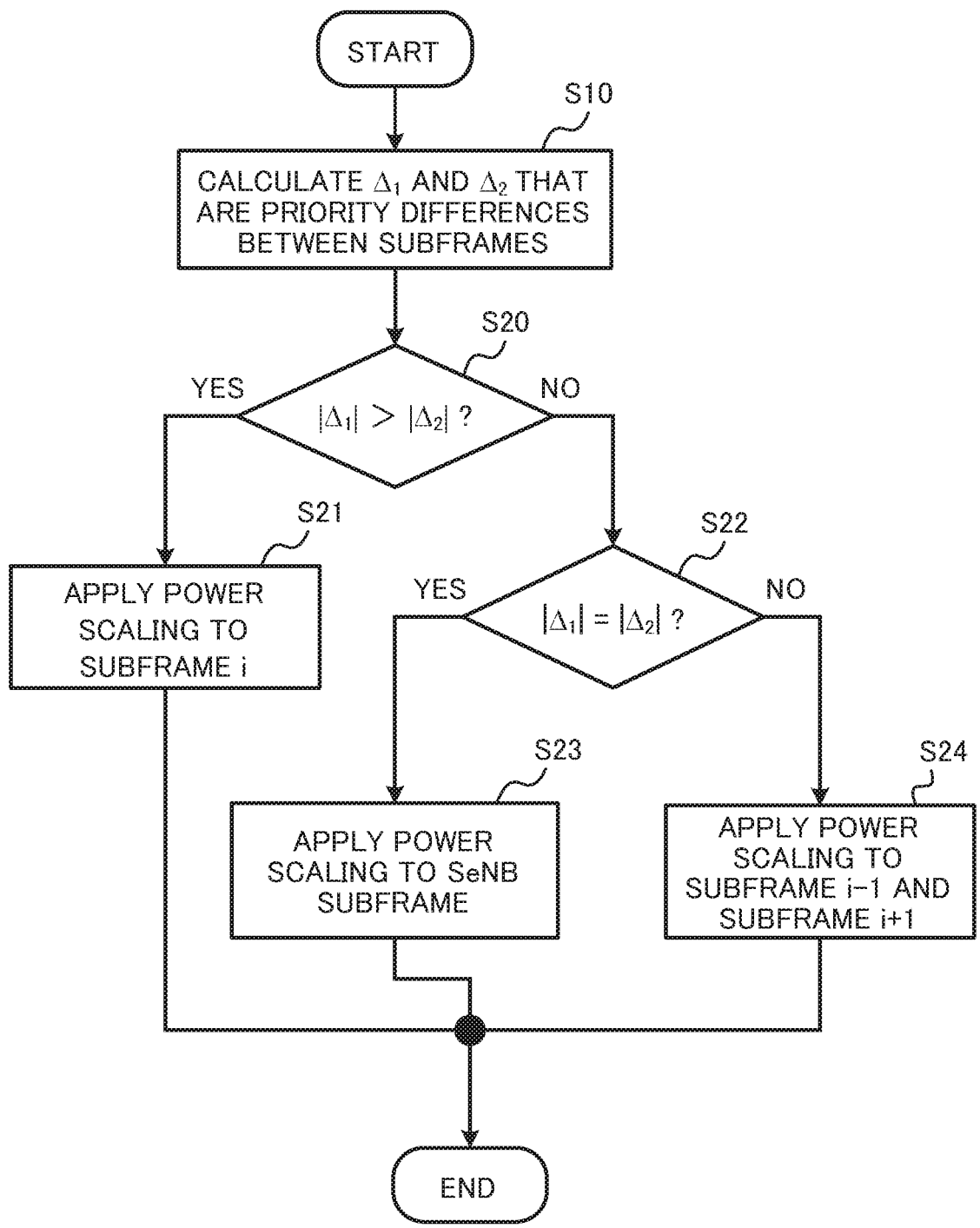
FIG. 10 is a diagram to show an example flowchart for determining power distribution based on differences between the priorities of signals transmitted at the same time.

FIG. 10 is a diagram to show an example of a flowchart for determining the distribution of power based on differences between the priorities of signals that are transmitted at the same time. Note that, in the process of applying power scaling, power dropping may be applied instead.

First, before transmitting uplink signals of a given eNB/CG in a given subframe, the user terminal calculates the priority differences $\Delta_1$ and $\Delta_2$ between subframes (step S10). Here, $\Delta_1$ is determined by subtracting the priority of subframe i−1 from the priority of subframe i, and $\Delta_2$ is determined by subtracting the priority of subframe i from the priority of subframe i+1. Note that subframe i is the above given subframe, subframe i−1 is a subframe of another eNB/CG that overlaps subframe i and that is transmitted before subframe i, and subframe i+1 is a subframe of another eNB/CG that overlaps subframe i and that is transmitted after subframe i.

Next, whether or not the absolute value of $\Delta_1$ ($|\Delta_1|$) is greater than the absolute value of $\Delta_2$ ($|\Delta_2|$) is determined (step S20). If $|\Delta_1|$ is greater than $|\Delta_2|$ (step S20: YES), power scaling is applied to subframe i (step S21).

On the other hand, when $|\Delta_1|$ is not greater than $|\Delta_2|$ (step S20: NO), then, whether or not $|\Delta_1|$ and $|\Delta_2|$ are equal is additionally determined (step S22). When $|\Delta_1|$ and $|\Delta_2|$ are equal (step S22: YES), power scaling is applied to the SeNB subframe (step S23). Also, when $|\Delta_1|$ and $|\Delta_2|$ are not equal (step S22: NO), power scaling is applied to subframe i+1 and subframe i−1 (step S24).

Figure 11:
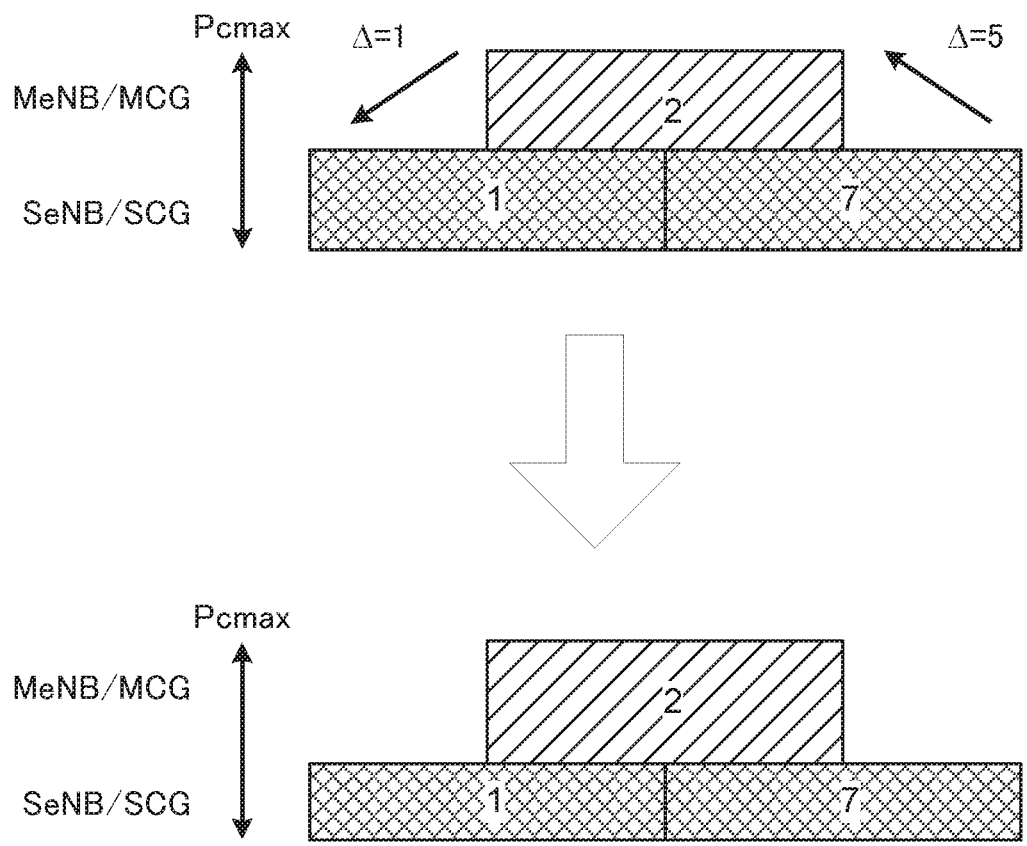
FIG. 11 is a diagram to show an example of determining power distribution based on differences between the priorities of signals transmitted at the same time.

FIG. 11 is a diagram to show an example of determining power distribution based on differences between the priorities of signals to be transmitted at the same time. In FIG. 11, the upper part shows the state before power is distributed, and the lower part shows the state after power is distributed, according to the present embodiment. In FIG. 11, the priorities of subframes i−1, i and i+1 are 1, 2 and 7, respectively. Consequently, $\Delta_1=1$ and $\Delta_2=5$ hold.

Before the power distribution in FIG. 11, the transmission interval of subframe i is power-limited. Following the flowchart of FIG. 10, the process of step S24 is executed, and power scaling is applied to subframes i−1 and i+1. As a result of this, as shown in the lower part of FIG. 11, the power of the MeNB/MCG is maintained.

When $|\Delta_1|$ is greater than $|\Delta_2|$, this is equivalent to the case where the priority of subframe i−1 is relatively high compared to subframe i and subframe i+1. In such cases, by applying power scaling to subframe i, it is possible to secure transmission power for subframe i−1, which has a relatively high priority, and maintain quality. Also, when $|\Delta_1|$ and $|\Delta_2|$ are equal, it is possible to control not to change the transmission power of MeNB subframes, which are important in securing connectivity between user terminals and the network, by applying power scaling to the SeNB subframes. Furthermore, the case where $|\Delta_1|$ is smaller than $|\Delta_2|$ means the priorities of subframe i−1 and subframe i are substantially equal, relatively, and the priority of subframe i+1 is low. Under these circumstances, it is possible to provide opportunities to secure power for subframe i by applying power scaling to subframe i−1 and subframe i+1.

Note that, although FIG. 10 shows an example of the method of determining power distribution, this is by no means limiting. For example, when $\Delta_1<0$ and $\Delta_2<0$ (for example, when the priorities of subframes i−1, i+1 are 7, 2 and 1, respectively), the flowchart, in which the steps S21 and S24 in FIG. 10 are switched, may be used. Also, when $\Delta_1\Delta_2<0$ holds (for example, when the priorities of subframes i−1, i and i+1 are 5, 7 and 4, respectively), it is possible to use the flowchart, which replaces step S20 of FIG. 10 with determining whether or not $\Delta_1$ is greater than $\Delta_2$.

(Variation 4)

Also, with the embodiments described above, power scaling/dropping is executed as appropriate. To be more specific, it is possible to select between the following two patterns of implementation methods. The first method of implementation is the method of applying power scaling/dropping in one step. In this case, a user terminal determines, when transmitting a given UL subframe, whether or not the sum of the transmission power of all CCs of both CGs exceeds Pcmax. When excess is identified as a result of this, power scaling/dropping is applied according to the priority rule of the second embodiment. According to this structure, differences between CGs are not taken into consideration, and, power scaling/dropping that is optimal on an overall scale can be applied following the priorities of all.

Also, executing power scaling/dropping in two steps is the other method of implementation. A user terminal, when transmitting a given UL subframe, first determines whether or not the sum of the transmission power per eNB/CG exceeds a predetermined value (for example, the maximum transmission power per CG). As a result of this, when the sum of the transmission power exceeds a predetermined value in any of the eNBs/CGs, power scaling/dropping is applied in that CG, and the transmission power is kept within the predetermined value per eNB/CG. Note that, this UE operation and the priority rule are the same as those in UL-CA of Rel. 11. After that, whether or not the sum of the transmission power of each eNB/CG exceeds Pcmax is determined, and, if excess is identified, power scaling/dropping is applied following the priority rule between eNBs/CGs, as described earlier with the second embodiment. According to this structure, in the first step (decision per eNB/CG), a certain level of power scaling can be executed by existing processes. Since the process of comparing priorities between CGs can be spared, it is possible to simplify the terminal processes, reduce the cost of the circuit structure, and so on.

(Variation 5)

Also, according to the embodiments described above, power scaling/dropping is applied to the transmission power of each channel (signal) in each CC, depending on the decisions as to whether or not the power limited state is present. Power scaling/dropping is produced as a result of the power limited state, and therefore there is a possibility that "the difference between the maximum transmission power of e UE and the transmission power demanded by an eNB," which originally is supposed to be reported in a PHR (Power Headroom Report), cannot be reported.

So, in dual connectivity, PHRs are calculated, on a per eNB/CG basis, using the values before power scaling/dropping is applied as a result of the power limited state. That is, the difference between the transmission power value initially required by each eNB and the maximum transmission power of each eNB/CG is calculated as a PH, and a PHR is reported. Note that, when the maximum transmission power of each eNB/CG is not configured, PHs may be calculated using each CC's maximum transmission power or the maximum transmission power per user terminal. According to this structure, it is possible to adequately report how much extra power is present with respect to the transmission power demanded by the eNBs.

(Structure of Radio Communication System)

Now, a structure of a radio communication system according to an embodiment of the present invention will be described below. In this radio communication system, the radio communication methods according to the above embodiments or variations are employed.

Figure 12:
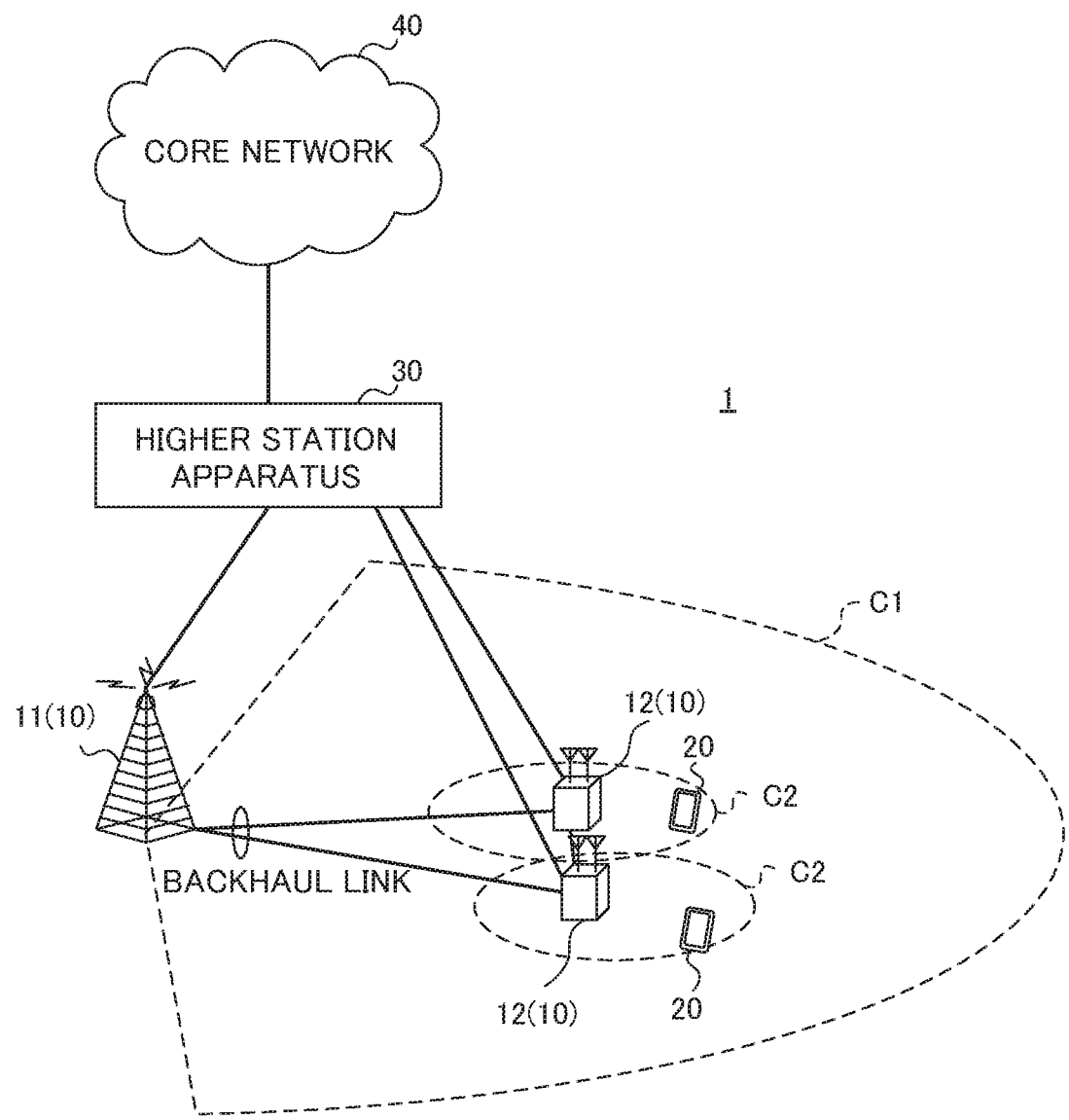
FIG. 12 is a diagram to show an example of a schematic structure of a radio communication system according to an embodiment of the present invention.

FIG. 12 is a schematic structure diagram to show an example of the radio communication system according to an embodiment of the present invention. As shown in FIG. 12, a radio communication system 1 is comprised of a plurality of radio base stations 10 (11 and 12), and a plurality of user terminals 20 that are present within cells formed by each radio base station 10, and that are configured to be capable of communicating with each radio base station 10. The radio base stations 10 are each connected with a higher station apparatus 30, and are connected to a core network 40 via the higher station apparatus 30.

In FIG. 12, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that illustrated in FIG. 10.

The macro cell C1 and the small cells C2 may use the same frequency band or may use different frequency bands. Also, the radio base stations 11 and 12 are connected with each other via an inter-base station interface (for example, optical fiber, the X2 interface, etc.).

Note that the macro base station 11 may be referred to as an "eNodeB" (eNB), a "radio base station," a "transmission point," and so on. The small base stations 12 are radio base stations having local coverages, and may be referred to as "RRHs" (Remote Radio Heads), "pico base stations," "femto base stations," "HeNBs" (Home eNodeBs), "transmission points," "eNodeBs" (eNBs) and so on.

The user terminals 20 are terminals to support various communication schemes such as LTE, LTE-A and so on, and may include both mobile communication terminals and stationary communication terminals. The user terminals 20 can communicate with other user terminals 20 via the radio base stations 10.

The higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. Note that the uplink and downlink radio access schemes are not limited to combinations of these.

Also, in the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH) and so on are used as downlink channels. User data, higher layer control information and predetermined SIBs (System Information Blocks) are communicated in the PDSCH. Downlink control information (DCI) is communicated by the PDCCH and the EPDCCH. Also, synchronization signals, MIBs (Master Information Blocks) and so on are communicated by the PBCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink channels. User data and higher layer control information are communicated by the PUSCH.

Figure 13:
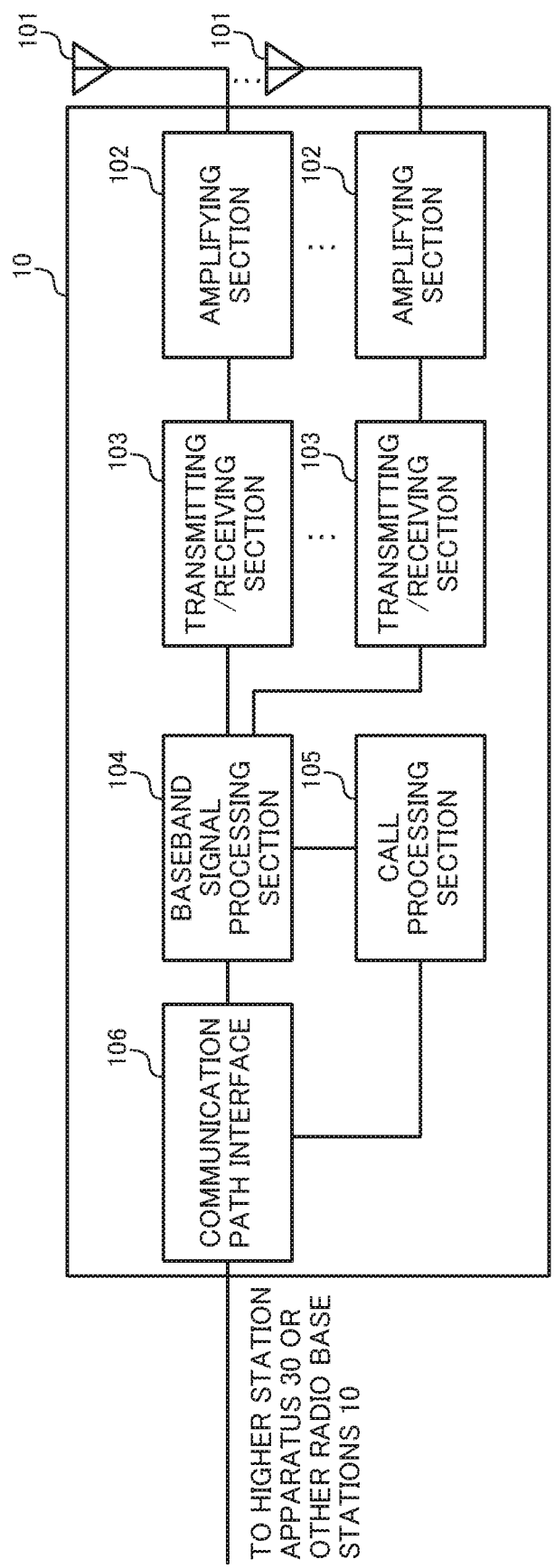
FIG. 13 a diagram to show an example of an overall structure of a radio base station according to an embodiment of the present invention.

FIG. 13 is a diagram to show an overall structure of a radio base station 10 according to the present embodiment. The radio base station 10 has a plurality of transmitting/receiving antennas 101 for MIMO communication, amplifying sections 102, transmitting/receiving sections (receiving sections) 103, a baseband signal processing section 104, a call processing section 105 and a communication path interface 106. Note that, the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The amplifying sections 102 amplify the radio frequency signals having been subjected to frequency conversion in the transmitting/receiving sections 103, and transmitted from the transmitting/receiving antennas 101.

On the other hand, as for uplink signals, radio frequency signals that are received in the transmitting/receiving antennas 101 are each amplified in the amplifying sections 102. Each transmitting/receiving section 103 receives the uplink signals amplified in the amplifying sections 102. The transmitting/receiving sections 103 convert the received signals into baseband signals through frequency conversion, and output the resulting signals to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The interface section 106 transmits and receives signals to and from the higher station apparatus 30 via a predetermined interface. Furthermore, the interface section 106 transmits and receives signals to and from neighboring radio base stations (backhaul signaling) via an inter-base station interface (for example, optical fiber, the X2 interface, etc.).

Figure 14:
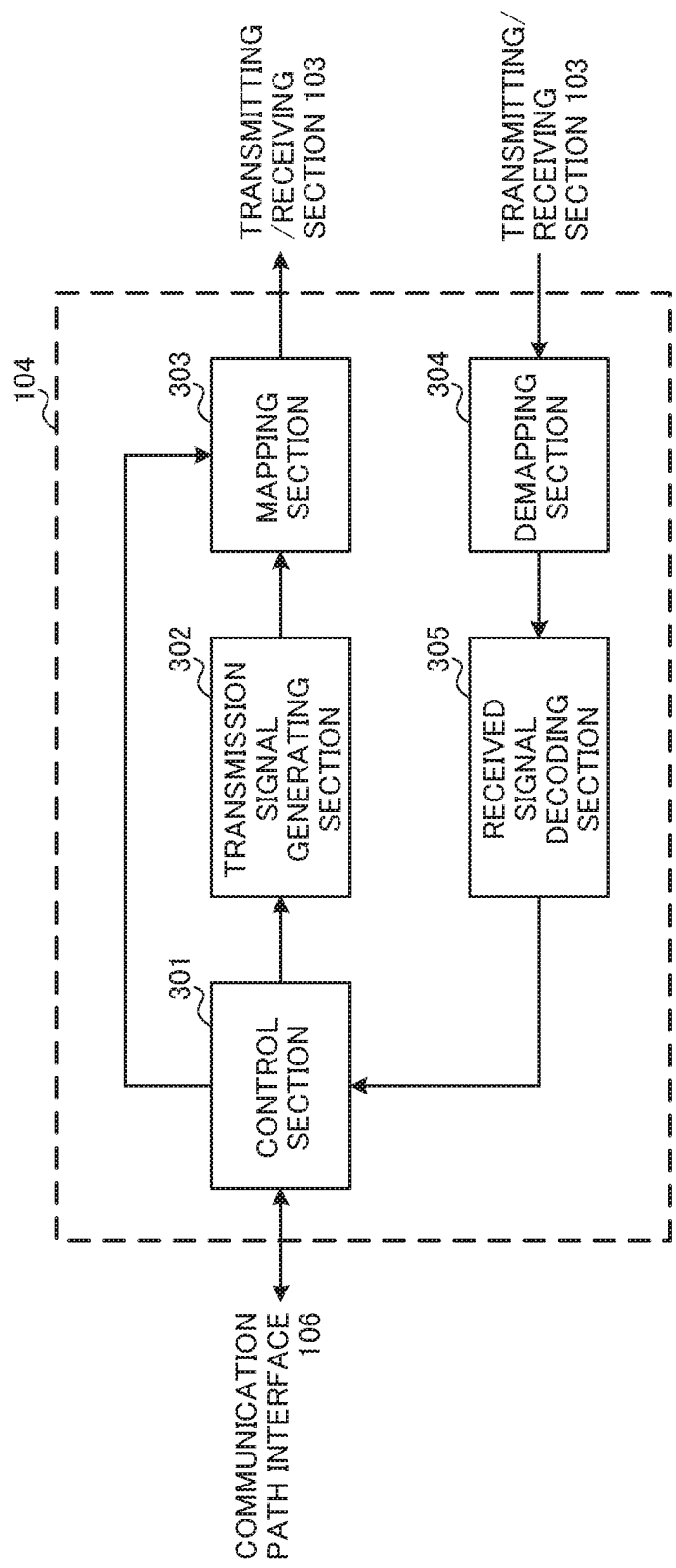
FIG. 14 a diagram to shown an example of a functional structure of a radio base station according to an embodiment of the present invention.

FIG. 14 is a diagram to show a principle functional structure of the baseband signal processing section 104 provided in the radio base station 10 according to the present embodiment. A shown in FIG. 14, the baseband signal processing section 104 provided in the radio base station 10 is comprised at least of a control section 301, a transmission signal generating section 302, a mapping section 303, a demapping section 304 and a received signal decoding section 305.

The control section 301 controls radio resource scheduling for downlink signals and uplink signals based on command information from the higher station apparatus 30, feedback information from each user terminal 20 and so on. That is, the control section 301 functions as a scheduler. Note that, when another radio base station 10 and/or the higher station apparatus 30 functions as the scheduler of the radio base station 10, the control section 301 does not have to function as a scheduler.

To be more specific, the control section 301 controls the scheduling of downlink reference signals, downlink data signals that are transmitted in the PDSCH, downlink control signals that are transmitted in the PDCCH and/or the EPDCCH, and so on. Also, the control section 301 also controls the scheduling of uplink data signals that are transmitted in the PUSCH, uplink control signals that are transmitted in the PUCCH or the PUSCH, RA preambles that are transmitted in the PRACH, and so on. These pieces of allocation control-related information are reported to the user terminals 20 by using downlink control signals (DCI).

The control section 301 controls the transmission signal generating section 302 and the mapping section 303 so as to adjust the uplink signal transmission power of user terminals 20 connected with the radio base station 10.

To be more specific, the control section 301 commands the transmission signal generating section 302 to generate transmission power control (TPC) commands for controlling the transmission power of uplink signals based on PHRs and channel state information (CSI) reported from the user terminals 20, the uplink data error rate, the number of times of HARQ retransmissions and so on, and controls the mapping section 303 to include the TPC commands in downlink control information (DCI) and report this to the user terminals 20. By this means, the radio base station 10 can specify the uplink signal transmission power to request to the user terminals 20. Note that the PHRs may be included and reported in MAC CE as well.

The control section 301 acquires information about the uplink transmission power for each radio base station 10 the user terminals 20 are connected with, based on the PHRs reported from the user terminals 20. To be more specific, the control section 301 acquires information about the transmission power of the cell where the subject radio base station belongs, based on real PHRs reported from the user terminals 20. Note that, as information about the transmission power of cells where the subject radio base station does not belong, the control section 301 may estimate the PUSCH bandwidth, channel states (path loss and so on), transmission power density (PSD), MCS level, channel quality and so on of cells formed by other radio base stations 10. Also, the control section 301 may estimate (calculate) the total extra transmission power of the user terminals 20 from these pieces of information.

The DL signal generating section 302 generates the downlink control signals, downlink data signals and downlink reference signals that are determined to be allocated in the control section 301, and outputs these signals to the mapping section 303. To be more specific, the downlink control signal generating section 302 generates DL assignments, which report downlink signal allocation information, and UL grants, which report uplink signal allocation information, based on commands from the control section 301. The data signals that are generated in the data signal generating section 303 are subjected to a coding process and a modulation process, based on coding rates and modulation schemes that are determined based on CSI from each user terminal 20 and so on.

The mapping section 303 maps the downlink signals generated in the transmission signal generating section 302 to radio resources based on commands from the control section 301, and outputs these to the transmitting/receiving sections 103.

The demapping section 304 demaps the signals received in the transmitting/receiving sections 103 and outputs the separated signals to the received signal decoding section 305. To be more specific, the demapping section 304 demaps the uplink signals transmitted from the user terminals 20.

The received signal decoding section 305 decodes the signals (for example, delivery acknowledgement signals (HARQ-ACK)) transmitted from the user terminals 20 in uplink control channels (the PRACH, the PUCCH, etc.), the data signals transmitted in the PUSCH, and so on, and outputs the results to the control section 301. Also, information included in the MAC CE reported from the user terminals 20 is also output to the control section 301.

Figure 15:
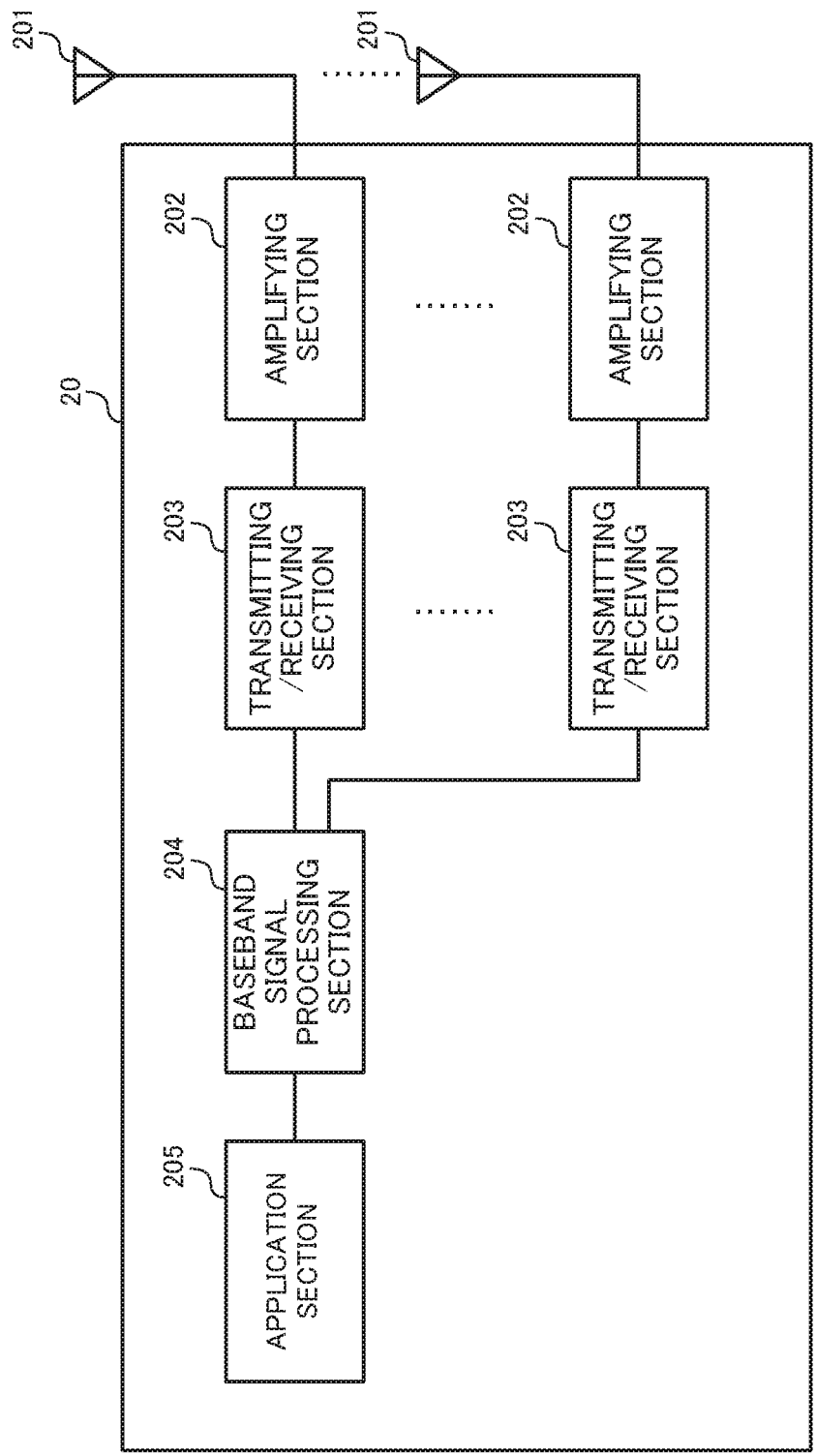
FIG. 15 is a diagram to show an example of an overall structure of a user terminal according to an embodiment of the present invention.

FIG. 15 is a diagram to show an overall structure of a user terminal 20 according to the present embodiment. As shown in FIG. 15, the user terminal 20 has a plurality of transmitting/receiving antennas 201 for MIMO communication, amplifying sections 202, transmitting/receiving sections 203, a baseband signal processing section 204 and an application section 205. Note that, transmitting/receiving sections 203 may be comprised of transmitting sections and receiving sections.

As for downlink data, radio frequency signals that are received in a plurality of transmitting/receiving antennas 201 are each amplified in the amplifying sections 202. Each transmitting/receiving section 203 receives the downlink signals amplified in the amplifying sections 202. The transmitting/receiving sections 203 convert the received signals into baseband signals through frequency conversion, and output the resulting signals to the baseband signal processing section 204.

In the baseband signal processing section 204, the baseband signals that are input are subjected to an FFT process, error correction decoding, a retransmission control receiving process, and so on. Downlink user data is forwarded to the application section 205. The application section 205 performs processes related to higher layers above the physical layer and the MAC layer. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The amplifying sections 202 amplify the radio frequency signals having been subjected to frequency conversion, and transmit the resulting signals from the transmitting/receiving antennas 201.

Figure 16:
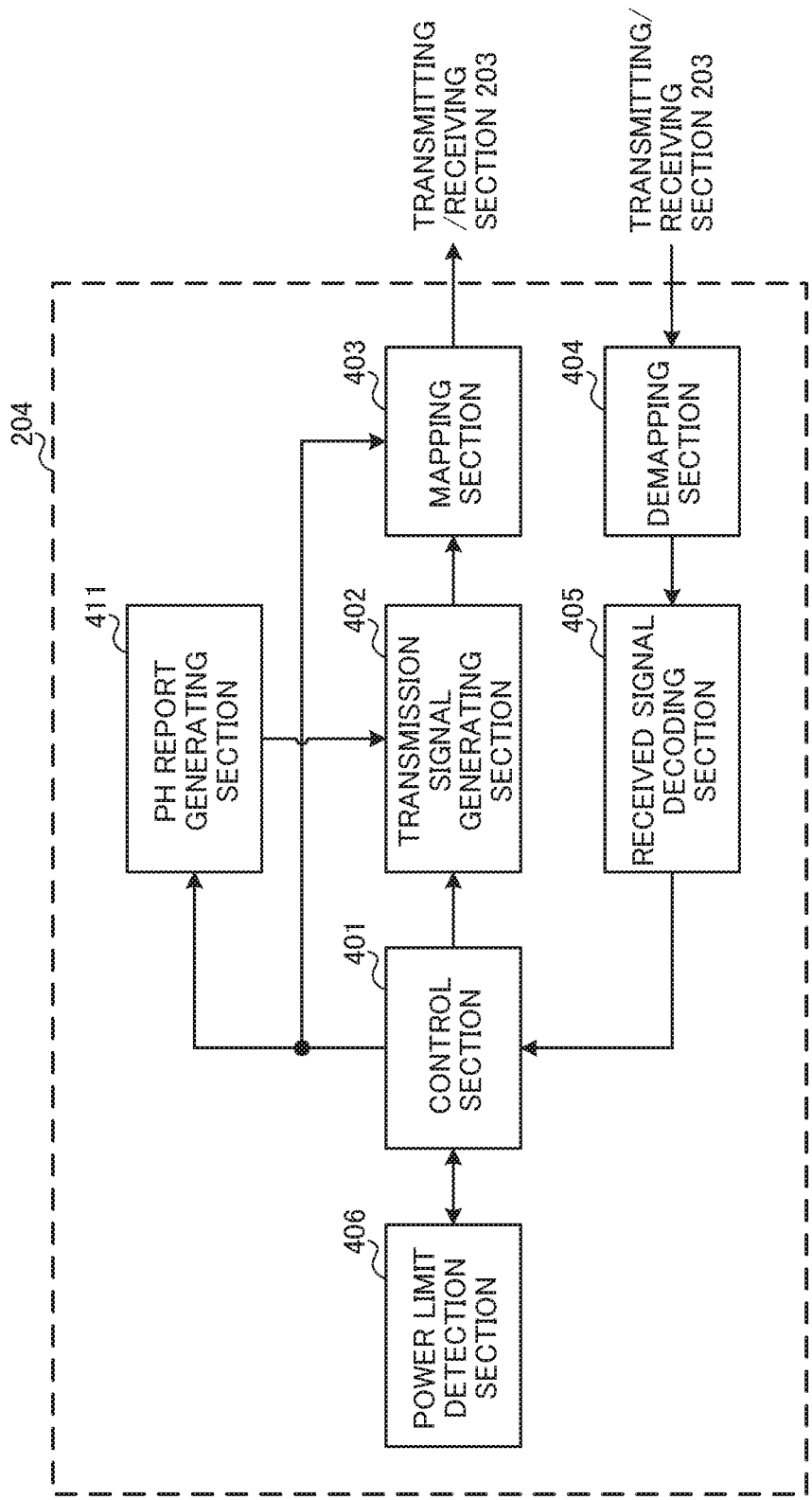
FIG. 16 is a diagram to show an example of a functional structure of a user terminal according to an embodiment of the present invention.

FIG. 16 is a diagram to show a principle functional structure of the baseband signal processing section 204 provided in the user terminal 20. As shown in FIG. 16, the baseband signal processing section 204 provided in the user terminal 20 is comprised at least of a control section 401, a transmission signal generating section 402, a mapping section 403, a demapping section 404, a received signal decoding section 405, a power limit detection section 406 and a PH report generating section 411.

The control section 401 acquires the downlink control signals (signals transmitted in the PDCCH) and downlink data signals (signals transmitted in the PDSCH) transmitted from the radio base stations 10, from the received signal decoding section 405. Based on the downlink control signals, results of deciding whether or not retransmission control is possible in response to the downlink data signals, and so on, the control section 401 controls the generation of uplink control signals (for example, delivery acknowledgement signals (HARQ-ACK), etc.), uplink data signals and so on. To be more specific, the control section 401 controls the transmission signal generating section 402 and the mapping section 403.

The transmission signal generating section 402 generates uplink control signals such as, for example, delivery acknowledgement signals (HARQ-ACK) and channel state information (CSI), based on commands from the control section 401. Also, the transmission signal generating section 402 generates uplink data signals based on commands from the control section 401. Note that, when a UL grant is included in a downlink control signal reported from the radio base stations, the control section 401 commands the transmission signal generating section 402 to generate an uplink data signal.

The mapping section 403 maps the uplink signals generated in the transmission signal generating section 402 to radio resources based on commands from the control section 401, and output the result to the transmitting/receiving section 203.

Also, the control section 401 controls the uplink transmission power of the user terminals 20. To be more specific, the control section 401 controls the transmission power of each cell (CC) based on signaling (for example, TPC commands) from each radio base station 20. Here, the control section 401 has the priority rule for uplink signals for each radio base station 10, and, when a plurality of uplink signals are transmitted in the same timing, the transmission power of each uplink signal is controlled with reference to these priorities.

As a priority rule, every time there are uplink signals of the same type, the control section 401 configures the priority of a first radio base station (for example, an MeNB) higher than the priority of a second radio base station (for example, an SeNB). For example, the priorities of all UL signals for the MeNB may be configured higher than the priorities of all UL signals for the SeNB (an example of the first embodiment). Also, every time there are uplink signals of the same type, the priority for the first radio base station and the priority for the second radio base station may be configured to neighbor each other. Furthermore, the relationship between signals in priority may be configured so that the same order as in UL-CA of Rel. 11 is maintained regardless of the eNBs (another example of the first embodiment). Note that the priorities of signals between the eNBs/CGs preferably represent the same order as that in UL-CA of Rel. 11. That is, from the highest one, the PRACH, the PUCCH, the PUSCH including UCI, the PUSCH not including UCI and the SRS are preferably included in the order of priorities.

Note that, when a plurality of priority rules are stipulated, the control section 401 may determine the priority rule to apply based on information related to priority rules, which is reported in downlink control information (DCI) in downlink control channels (PDCCH and EPDCCH) from the radio base stations 10, higher layer signaling (for example, RRC signaling), broadcast signals (for example, SIB s) and so on.

Also, the control section 401 executes transmission power control in cooperation with the power limit detection section 406 so that the control section 401 ensures that the transmission power of signals is not changed in the middle of uplink subframes (UL subframes), and the above rules are followed. To do so, from the UL grants/DL assignments that are received, the control section 401 outputs the UL transmission conditions (the bandwidth, the modulation scheme, the UL transmission power that is demanded based on these, and so on) to the power limit detection section 406.

When there is a period in which a given UL subframe is planned to be transmitted to a given eNB/CG (transmission-planned period), the power limit detection section 406 investigates the transmission power of all UL subframes of other eNBs/CGs having partially or entirely simultaneous transmission intervals with that UL subframe, based on the information of UL transmission conditions received as input from the control section 401, determines whether or not the total transmission power of uplink signals for each eNB/CG exceeds the maximum allowable power (Pcmax), and outputs the decision to the control section 401 (second embodiment).

When there is a part that is determined by the power limit detection section 406 to exceed the maximum allowable power (that is, to be power-limited), the control section 401 compares the priorities of signals in this part. The control section 401 reduces (by way of scaling or dropping) the allocation of power for the UL subframes of the lower priorities (nonpreferential UL subframes) down to a value where the power demanded by the UL subframes of the higher priorities (preferential UL subframes) can be adequately distributed.

Also, before making the above decision, the power limit detection section 406 may, for each eNB/CG in the transmission-planned period, decide whether or not the transmission power of each UL subframe exceeds a predetermined value (for example, the maximum transmission power per eNB/CG), and output the decisions to the control section 401 (variation 4).

When, according to the decisions from the power limit detection section 406, the sum of transmission power exceeds the predetermined value in any of the eNBs/CGs, the control section 401 applies power scaling/dropping to each eNB/CG to keep the transmission power of every eNB/CG within the predetermined value.

Note that the transmission signal generating section 402 preferably generates user terminal capability information (UE capability information) for reporting the above configurations and/or the like to the radio base stations 10. For example, user terminal capability information to represent whether or not asynchronous dual connectivity can be supported, whether or not the transmission power of future transmitting signals can be calculated, whether or not transmission power can be shared on a dynamic basis between eNBs/CGs and so on may be generated (variation 2).

Based on commands from the control section 401, the PH reporting generating section 411 calculates the PH (Power Headroom) of each eNB/CG from the maximum transmission power of uplink signals from that eNB/CG and the uplink signal transmission power initially demanded by the eNB/CG, generates a PHR and outputs this to the transmission signal generating section 402 (variation 5).

The demapping section 404 demaps the signals received in the transmitting/receiving section 203, and outputs the separated signals to the received signal decoding section 405. To be more specific, the demapping section 404 demaps the downlink signals transmitted from the radio base stations 10.

The received signal decoding section 405 decodes the downlink control signals (PDCCH signals) transmitted in the downlink control channel (PDCCH), and outputs the scheduling information (uplink resource allocation information), information about the cells to which delivery acknowledgement signals in response to the downlink control signals are fed back, TPC commands and so on, to the control section 401.

Now, although the present invention has been described in detail with reference to the above embodiments, it should be obvious to a person skilled in the art that the present invention is by no means limited to the embodiments described herein. For example, the above-described embodiments may be used separately, or may be used in combinations. The present invention can be implemented with various corrections and in various modifications, without departing from the spirit and scope of the present invention defined by the recitations of claims. Consequently, the description herein is only provided for the purpose of illustrating examples, and should by no means be construed to limit the present invention in any way.

The invention claimed is:

1. A terminal comprising:
a transmitter that performs transmission in a first cell group (CG) and a second CG; and
a processor that,
in a first case when the transmitter reports terminal capability information indicating that the terminal is capable of sharing transmission power dynamically and if transmission in the first CG overlaps in time with transmission in the second CG, reduces transmission power of the second CG so that total transmission power of the transmission in the first CG and the transmission in the second CG does not exceed maximum allowable power, and
in a second case when the transmitter does not report the terminal capability information, power is allocated semi-statically in advance for the first CG and the second CG and the processor does not perform the transmission in the second CG at a timing when the transmission in the second CG overlaps in time with the transmission in the first CG,
wherein the transmitter reports the terminal capability information to at least one of a first base station of the first CG and a second base station of the second CG, and communication with the first base station and the second base station is carried out according to the first case or the second case based on the reported terminal capability information.

2. The terminal according to claim 1, wherein if the transmitter reports the terminal capability information and if the transmission in the first CG overlaps in time with the transmission in the second CG, the processor reduces the transmission power of the second CG in a portion of a subframe so that the total transmission power of the transmission in the first CG and the transmission in the second CG does not exceed the maximum allowable power.

3. The terminal according to claim 1, wherein if the transmitter reports the terminal capability information and if the transmission in the first CG overlaps in time with the transmission in the second CG, the processor reduces the transmission power of the second CG so that the total transmission power of the transmission in the first CG and the transmission in the second CG does not exceed the maximum allowable power and does not change the transmission power of the second CG in a portion of a subframe.

4. A radio communication method for a terminal, comprising:
performing transmission in a first cell group (CG) and a second CG; and
in a first case when the terminal reports terminal capability information indicating that the terminal is capable of sharing transmission power dynamically and if transmission in the first CG overlaps in time with transmission in the second CG, reducing transmission power of the second CG so that total transmission power of the transmission in the first CG and the transmission in the second CG does not exceed maximum allowable power, and
in a second case when the transmitter terminal does not report the terminal capability information, allocating power semi-statically in advance for the first CG and the second CG and not performing the transmission in the second CG at a timing when the transmission in the second CG overlaps in time with the transmission in the first CG,
wherein the terminal reports the terminal capability information to at least one of a first base station of the first CG and a second base station of the second CG, and communication with the first base station and the second base station is carried out according to the first case or the second case based on the reported terminal capability information.

5. A base station comprising:
a receiver that performs reception in at least one of a first cell group (CG) and a second CG; and
a processor that carries out communication according to a first case or a second case based on a reported terminal capability information,
wherein in the first case when the receiver receives terminal capability information indicating that a terminal is capable of sharing transmission power dynamically and if transmission in the first CG overlaps in time with transmission in the second CG, transmission power is reduced of the second CG so that total transmission power of the transmission in the first CG and the transmission in the second CG does not exceed maximum allowable power, and
in a second case when the receiver does not receive the terminal capability information, power is allocated semi-statically in advance for the first CG and the second CG and the transmission is not performed in the second CG at a timing when the transmission in the second CG overlaps in time with the transmission in the first CG.

6. A system comprising a terminal and a first base station and a second base station, wherein:
the terminal comprises:
a transmitter that performs transmission in a first cell group (CG) and a second CG; and
a processor that,
in a first case when the transmitter reports terminal capability information indicating that the terminal is capable of sharing transmission power dynamically and if transmission in the first CG overlaps in time with transmission in the second CG, reduces transmission power of the second CG so that total transmission power of the transmission in the first CG and the transmission in the second CG does not exceed maximum allowable power, and
in a second case when the transmitter does not report the terminal capability information, power is allocated semi-statically in advance for the first CG and the second CG and the processor does not perform the transmission in the second CG at a timing when the transmission in the second CG overlaps in time with the transmission in the first CG,
wherein the transmitter reports the terminal capability information to at least one of the first base station of the first CG and the second base station of the second CG, and communication with the first base station and the second base station is carried out according to the first case or the second case based on the reported terminal capability information.

* * * * *